United States Patent [19]

Playfoot et al.

[11] 3,962,919

[45] June 15, 1976

[54] TEMPERATURE COMPENSATED INDUCTIVE LIQUID METAL LEVEL DETECTION SYSTEM

[75] Inventors: Kerwin C. Playfoot, Horseheads; William H. Todt, Elmira Heights, both of N.Y.

[73] Assignee: Westinghouse Electric Corporation, Pittsburgh, Pa.

[22] Filed: July 15, 1975

[21] Appl. No.: 596,140

[52] U.S. Cl. ................. 73/290 R; 317/DIG. 3; 336/179
[51] Int. Cl.² ........................... G01F 23/26
[58] Field of Search .......... 73/290 R, 304 R; 336/179; 317/131, DIG. 3

[56] References Cited
UNITED STATES PATENTS

| | | | |
|---|---|---|---|
| 3,326,043 | 6/1967 | Roeske et al. | 73/290 R |
| 3,402,607 | 9/1968 | Cambillard et al. | 73/304 R |
| 3,722,281 | 3/1973 | Marsh | 73/304 R |
| 3,808,508 | 4/1974 | Ford | 317/131 |
| 3,834,234 | 9/1974 | Kobayashi et al. | 73/290 R |
| 3,896,671 | 7/1975 | Marinaccio | 73/304 R |

*Primary Examiner*—Richard C. Queisser
*Assistant Examiner*—Frederick Shoon
*Attorney, Agent, or Firm*—W. G. Sutcliff

[57] ABSTRACT

A temperature compensated inductive liquid metal level detection system and a preferred probe structure is detailed. The temperature compensation is provided by provision of a separate temperature compensation coil as part of the inductive probe.

5 Claims, 2 Drawing Figures

TEMPERATURE COMPENSATED INDUCTIVE LIQUID METAL LEVEL DETECTION SYSTEM

BACKGROUND OF THE INVENTION

The present invention relates to inductive systems for measuring liquid metal level, such as in sodium and sodium-potassium systems. These reactive liquid metals can be used as a coolant in fast flux breeder reactor facilities. The presence and level of the reactive liquid metal must be readily ascertainable, and numerous liquid metal probes are typically incorporated throughout such systems as well as in the coolant systems.

The inductive type liquid metal level sensor generally comprises a bifilar wound transformer which is immersible in the liquid metal containment, although the probe is typically enclosed within a dry thimble or tube, so that it does not actually contact the liquid metal. A constant current power source drives the primary coil and induces an output voltage signal in the secondary coil, which induced signal varies as the level of the liquid metal about the secondary coil. It is thus possible to determine from the variable inductive output voltage the level of the liquid metal in the containment. The resistance of the probe coil varies as the temperature of the coils is varied, and this lessens the accuracy of the probe. With the use of a constant current drive it has been the practice to provide temperature compensation for such an inductive probe by arranging to measure the voltage drop across the primary coil. Since the primary coil resistance for a given temperature is measurable, a calibration curve of primary coil resistance versus temperature characteristic can be worked out experimentally to compensate for the sodium temperature about the primary coil. The liquid metal in the containment systems can be varied from about 300° to 1200°F so that the inductive probe must be operative and accurate over a wide temperature range. The prior art system of temperature compensation had by measuring the resistance change of the primary coil assumes that the inductive probe is in an isothermal environment. The total length of the inductive probe can of course vary over a significant distance, and typical probe coil lengths are from 20 inches to 200 inches. The probe coil is not in fact subject to an isothermal environment until the level of the metal completely covers the active probe length. Thus, serious temperature gradients can exist over the probe length when it is substantially uncovered by the liquid metal. This can lead to considerable inaccuracy for the probe. The reliance of the temperature compensation upon measuring the primary coil voltage drop requires that the wire used in the inductive probe must be tightly controlled with respect to having a linear resistance versus temperature characteristic.

SUMMARY OF THE INVENTION

An inductive liquid metal level detection system is detailed having an improved temperature compensation system. The inductive bifilar wound transformer probe is varied by provision of a temperature compensation coil about at least one end of the support mandrel upon which the transformer probe is wound. The temperature compensation coil or coils is inductively coupled to the primary coil of the bifilar transformer. The voltage drop across the temperature compensation coil varies as a function of the ambient temperature of the liquid metal about the temperature compensation coil to provide a temperature indicative output signal. This signal is applied to amplifier means to which is also applied the induced output of the secondary coil of the bifilar transformer. The temperature compensation signal is used to correct the output signal of the secondary coil to more accurately indicate the correct depth or level of the liquid metal about the probe.

The temperature compensation coil is preferably wrapped at least at the bottom extending end of the mandrel about which the bifilar transformer probe is wound. The bifilar transformer coil probe is preferably made of a coaxial cable with the outer sheath of the cable being electrically connected to the conductor mandrel about which it is wrapped. The temperature compensation coil likewise is formed preferably of a coaxial cable, with the outer sheath electrically connected to the conductive mandrel about which it is wrapped. The temperature compensation coil preferably has about 5% of the number of primary coil turns. The temperature compensation coil is formed about the bottom extending end of the mandrel so that the temperature compensation coil will always be fully covered by the liquid metal prior to the level measuring secondary coil being surrounded by the liquid metal. In this way the accuracy of the probe at the lower end is improved. As the level of the liquid metal increases until the probe is fully covered the temperature gradient across the level sensing winding will not change the compensation signal. The accuracy of the probe over its full range is thus improved.

DESCRIPTION OF THE PREFERRED EMBODIMENTS

Figure 1:
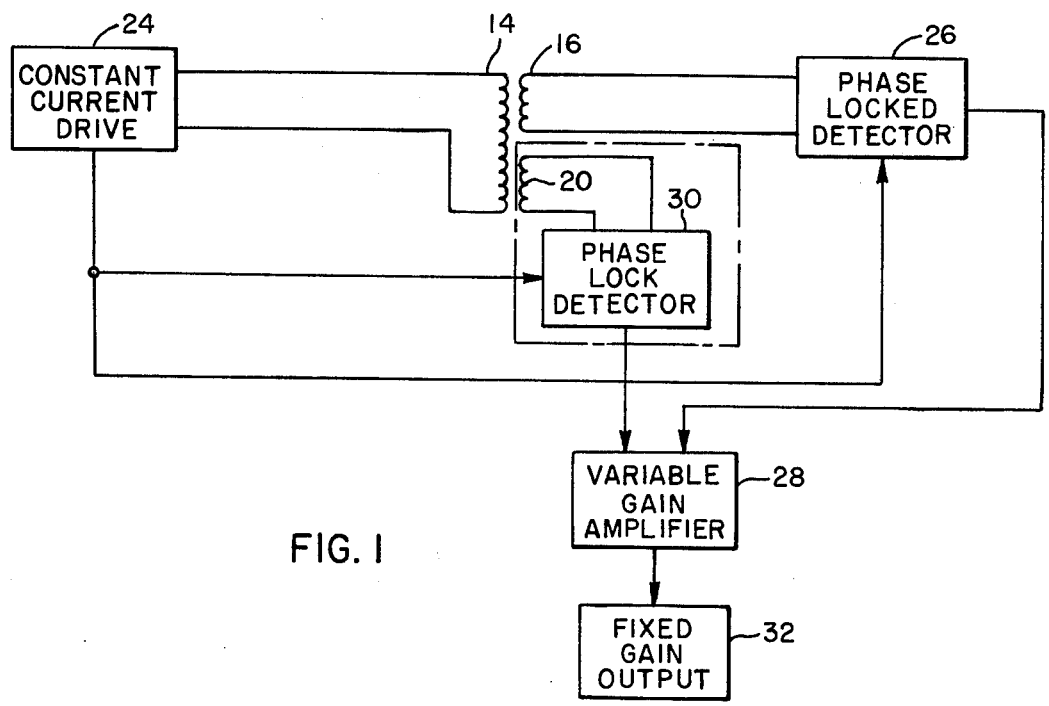
FIG. 1 is a simplified electrical schematic of a temperature compensated inductive level metal level detection system of the present invention.
Figure 2:
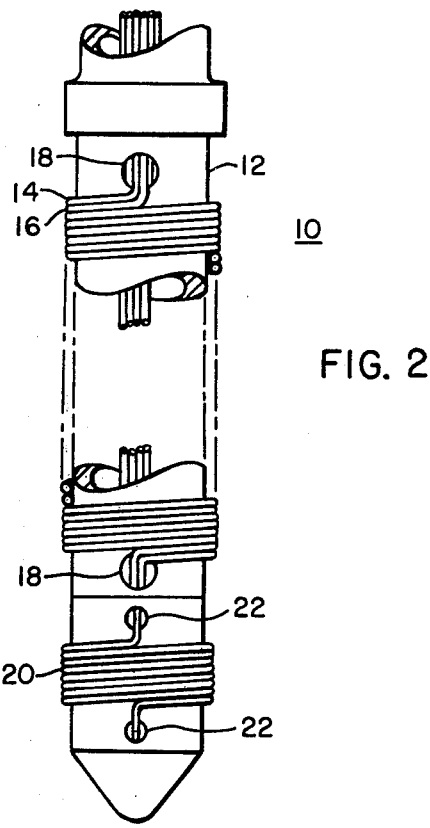
FIG. 2 is a view of an inductive level liquid metal level probe structure utilized in the present invention.

The temperature compensated inductive liquid metal level system of the present invention can be best understood by reference to the exemplary embodiments in the drawings wherein in FIG. 1 the inductive probe is typically immersed in the liquid metal which is not seen. The inductive probe 10 is actually seen in greater detail in FIG. 2. The inductive probe 10 comprises the conductive support mandrel 12 about which bifilar wound primary coil 14 and secondary coil 16 are wound. The conductive mandrel 12 is preferably a tubular metal body, preferably of stainless steel, with the ends of the primary and secondary coils being passed through apertures 18 provided at each end of the coils to permit the coil leads to be directed into the hollow central portion of the tubular mandrel and passed out one end of the probe for connection to the electrical system. A temperature compensation coil 20 is wrapped about the bottom extending end of the mandrel 12. The compensation coil ends are likewise passed through apertures 22 through one end of the mandrel to the system. The bifilar wound primary and secondary coils are typically formed of coaxial cable which has about a 60 mil outside diameter, with the outer metallic shield of this cable being brazed to the conductive mandrel. A temperature compensation coil 20 is likewise preferably formed of similar coaxial cable with the shield brazed to the mandrel. The temperature compensation coil typically has about 5% of the number of coil turns as does the primary coil 14.

The inductive liquid metal level detection system is illustrated in FIG. 1, in which constant current drive power supply means 24 is electrically connected to the center wire of the primary coil 14. A constant current flows through the primary coil 14, and an induced output voltage is produced in the center wire of the secondary coil 16, which voltage is a function of the level of the liquid metal about the secondary coil. The presence of the liquid conductive metal about the secondary coil acts to effectively short circuit the turns of the secondary coil which are immersed in the liquid metal. In this way the induced voltage is varied as a function of the liquid metal level. The secondary coil 16 is electrically connected to a phase locked detector 26, which is designed to discriminate between the output signal induced voltage which is in phase with the constant current drive current and extraneous electrical noise signals. The output of phase locked detector 26 is fed to a variable gain amplifier 28.

The temperature compensation coil 20 is inductively coupled to the primary coil and an output voltage signal is induced across the coil with the output of this temperature compensation coil fed to a phase lock detector 30, to again permit discrimination of noise from the voltage drop across the temperature compensation coil. The output of the phase lock detector 30 is a temperature compensation signal which is fed to the variable amplifier 28 to effect correction of the secondary coil output signal with the temperature compensated signal. The output signal from the variable gain amplifier 28 is fed to a fixed gain output and indicating means 32 for indicating the liquid metal level. The temperature compensation coil is likewise preferably a coaxial cable in which the conductive outer sheath is brazed to the conductive mandrel. The center wire of the coaxial cable is the actual coil across which the compensation signal is induced.

It had been necessary previously to use a conductive metal for the primary coil center wire, which exhibited a highly linear resistance characteristic because of the lack of a temperature compensation means. The material used was typically thermocouple wire. With the provision of a temperature compensation coil per the present invention there is no need for such stringent primary coil center wire linear resistance characteristic. Conventional conductors such as copper can now be used as the primary center wire.

In another embodiment, an additional temperature compensation coil is disposed at the upper end of the probe mandrel closely spaced from the bifilar wound coils. In this way the temperature gradient across the entire length of the probe can be determined for greater compensation accuracy. Of course, additional signal comparing means would be required in the circuitry.

It is also possible to reduce the number of leads which must be brought out of the probe, by connecting together one end of the secondary coil and the temperature compensation coil as a common lead.

What we claim is:
1. An inductive liquid metal level probe comprising a bifilar wound transformer coil wrapped about an elongated conductive support mandrel, with the coil formed of coaxial cable with the outer sheath electrically connected to the conductive support mandrel, and wherein a temperature compensation coil is disposed about at least one end of the support mandrel and is inductively coupled to the primary of the bifilar wound transformer, with the temperature compensation coil formed of coaxial cable with the outer sheath electrically connected to the support mandrel.

2. The probe specified in claim 1, wherein the mandrel is a tubular member with apertures therethrough at the ends of the transformer coil and the temperature compensation coil, with the coil leads passing through respective apertures, and extending through the tubular mandrel for connection to the drive and sensing circuitry.

3. The probe specified in claim 1, wherein the temperature compensation coil is preferably disposed about the bottom end of the support mandrel.

4. An inductive liquid metal level detection system comprising:
a. an inductive probe which is insertable into a sealed tube which is disposed in the depth direction in the liquid metal chamber, which probe comprises a bifilar wound transformer wrapped about an elongated tubular support mandrel, with a temperature compensation coil disposed about at least about one end of the support mandrel and inductively coupled to the primary of the bifilar wound transformer coil;
b. a constant current power supply electrically connected to the primary coil of the bifilar wound transformer coil, the secondary coil of the bifilar wound transformer and the temperature compensation coil are connected to an amplifier means, with the primary coil producing an induced output voltage signal across the secondary coil which is a function of the number of turns of the secondary coil which are effectively short circuited by the presence of liquid metal about the sealed tube within which the probe is disposed, and wherein the induced voltage across the temperature compensation coil varies as a function of the ambient temperature about the temperature compensation coil to provide a temperature indicative output signal,
c. amplifier means electrically connected to the secondary coil and the temperature compensation coil with the respective output signals of these coils applied to the amplifier means to generate a temperature compensated output signal which is indicative of the depth of the liquid metal about the probe.

5. The inductive liquid metal level detection system specified in claim 4, wherein the temperature compensation coil is disposed about the bottom extending end of the support mandrel.

* * * * *